June 18, 1963  E. L. MEAD  3,094,224
STOCK FEEDING DEVICE FOR STRUCTURAL STEEL SAW
Filed Feb. 10, 1960  4 Sheets-Sheet 3
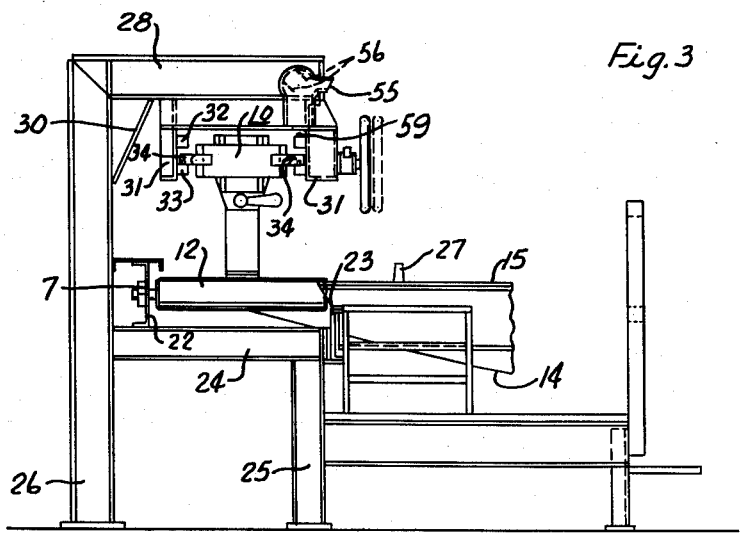
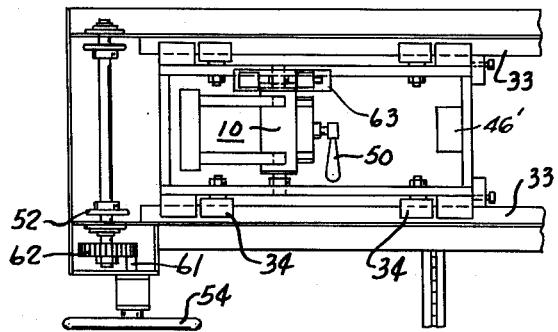
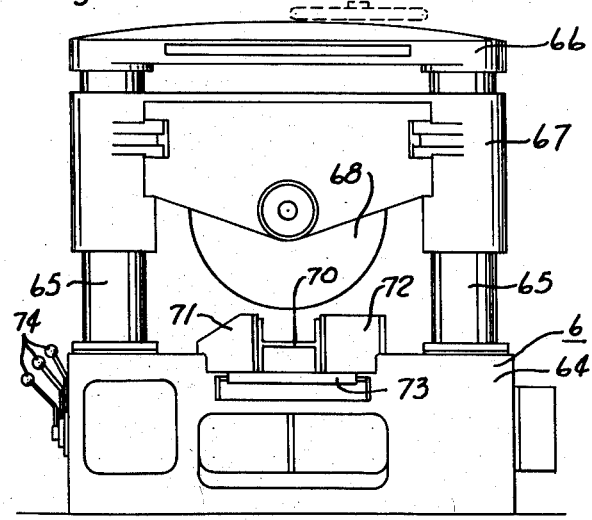
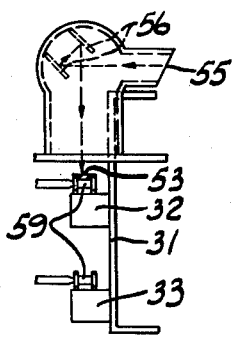
INVENTOR.
EDWIN L. MEAD
BY
HIS ATTORNEY

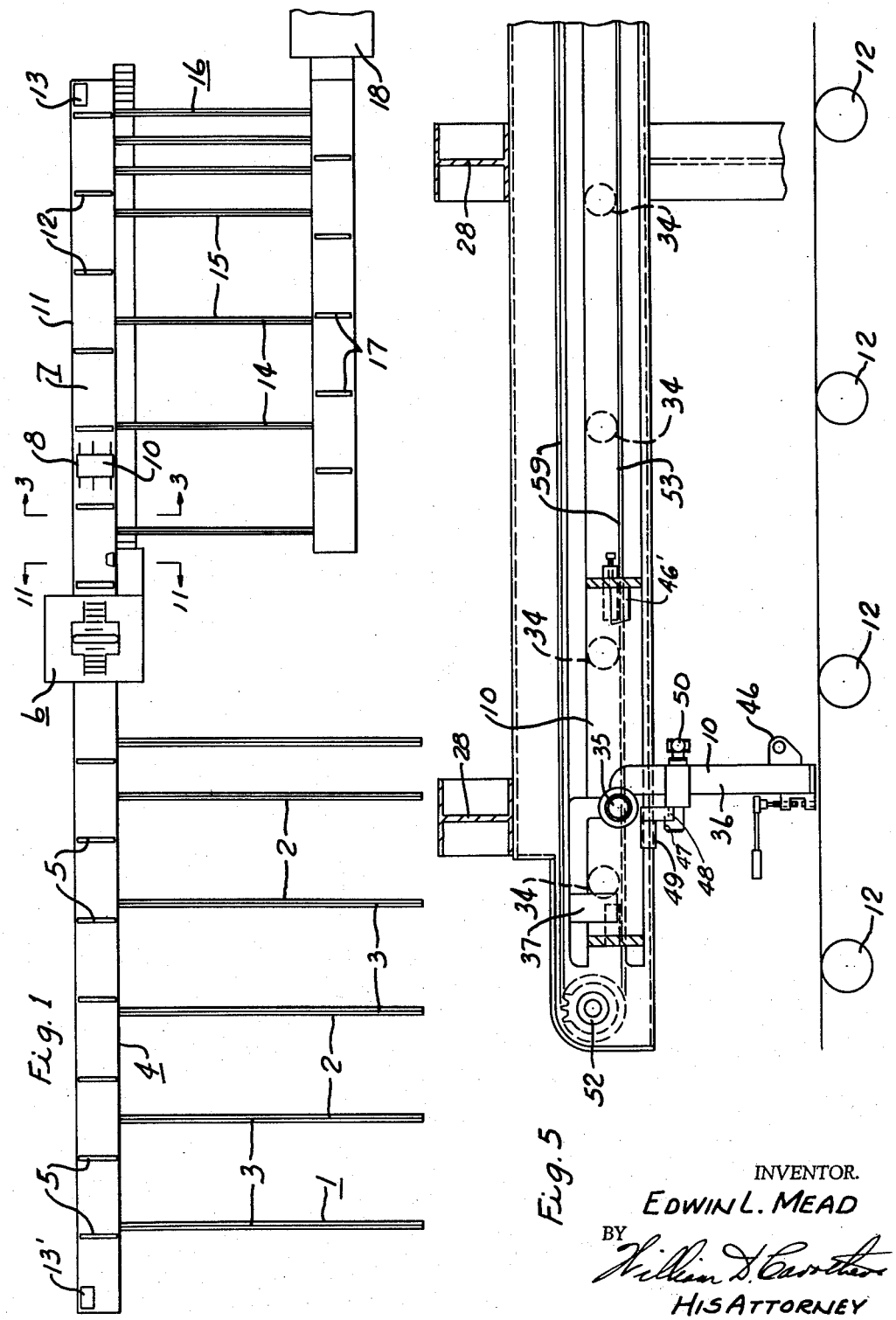

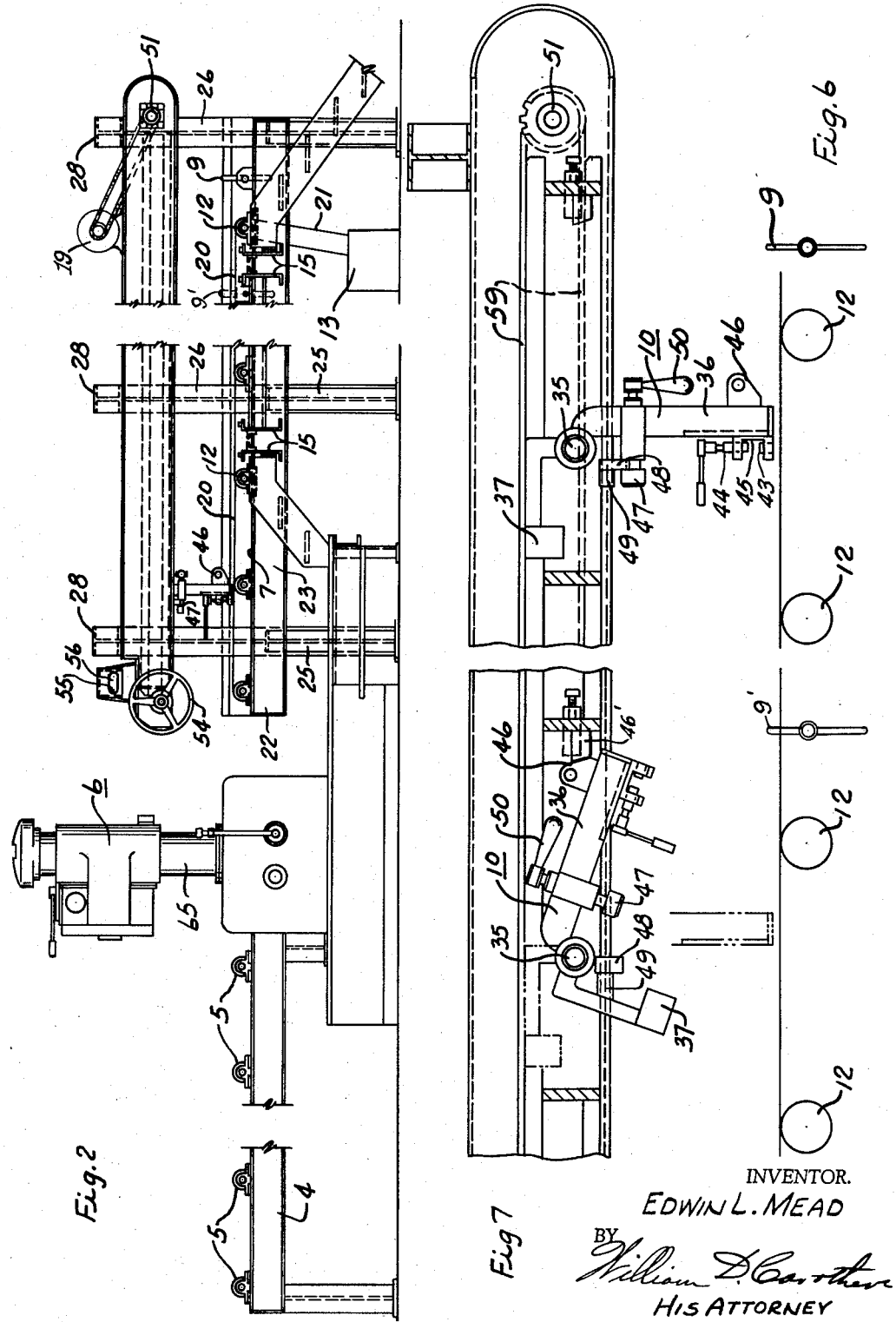

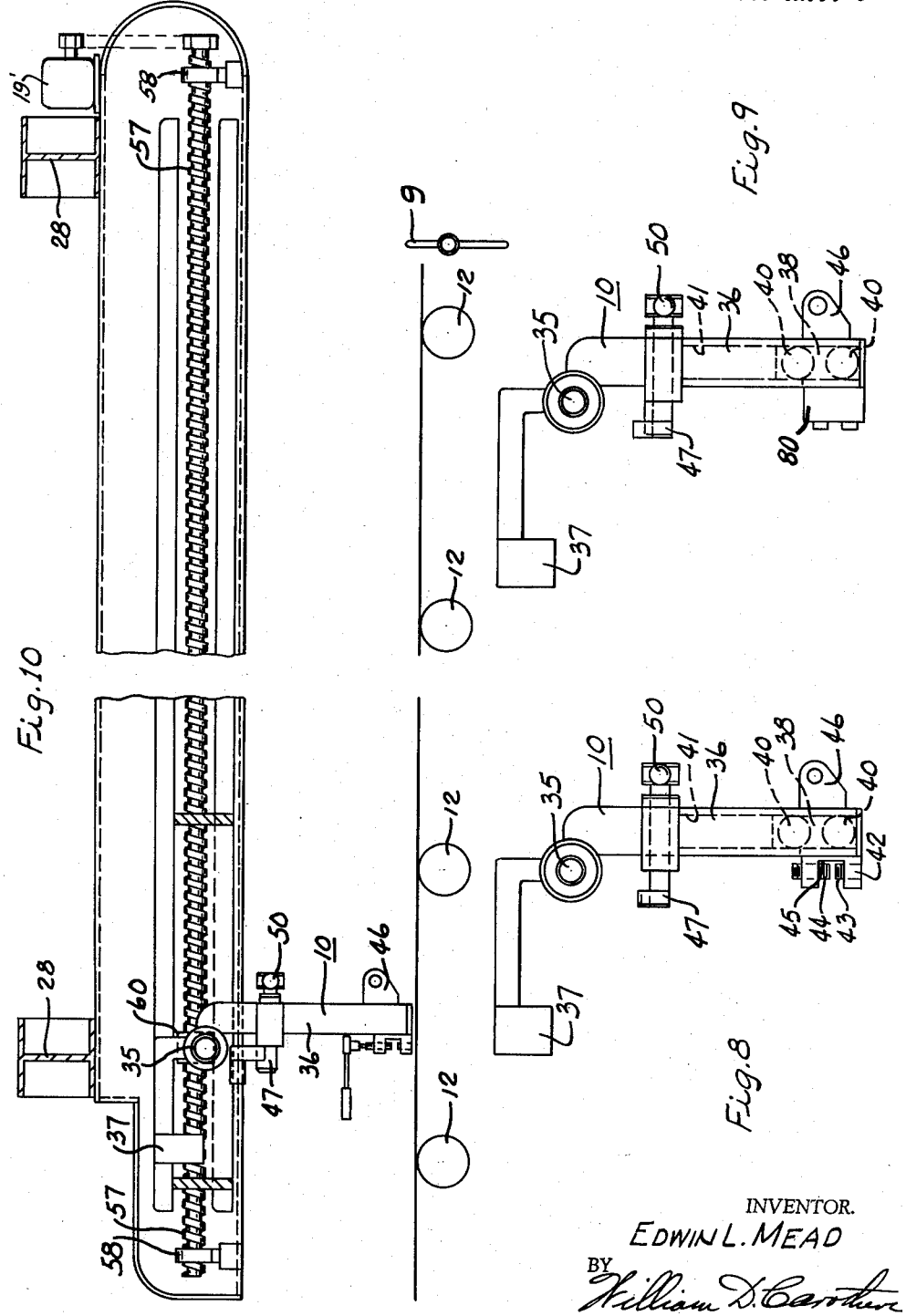

United States Patent Office 3,094,224
Patented June 18, 1963

3,094,224
STOCK FEEDING DEVICE FOR STRUCTURAL STEEL SAW
Edwin L. Mead, Pittsburgh, Pa., assignor to Mulfab Corporation, Pittsburgh, Pa., a corporation of Pennsylvania
Filed Feb. 10, 1960, Ser. No. 7,828
4 Claims. (Cl. 214—1.1)

This invention relates to long steel stock measuring and cutting machines.

The machine is provided with a track having a carriage that carries a clamp to engage on the end of the steel stock workpiece and pull it through a cutting station until the exact length is measured, the stock workpiece is then clamped and the cutting means is set in motion while the carriage returns in readiness to engage the next stock workpiece.

The principal object of this invention is the provision of a positively driven carriage having a clamp to engage and pull the stock for a predetermined length. This positive drive may be obtained by a long rotary screw or endless chain and the like and a final vernier measurement may be made by a hand wheel. The cutting mechanism may be a shear or a saw. The latter is preferable, particularly for stock of large cross section. The saw is preferably provided with an automatic feed and when finished with its cut, it is retracted and the workpiece is moved out of the saw station to a storage rack.

The movement of the stock in this manner provides fast and accurate measurement which increases the production of fabricated steel.

Other objects and advantages appear hereinafter in the following description and claims.

The accompanying drawings show for the purpose of exemplification without limiting the invention or claims thereto, certain practical embodiments illustrating the principles of this invention wherein:

FIG. 1 is a plan view of the measuring and cutting machine.

FIG. 2 is a view in side elevation with parts broken away of the stock measuring device comprising this invention.

FIG. 3 is a view in vertical section taken on the line 3—3 of FIG. 1.

FIG. 4 is a plan view of the structure shown in FIG. 3.

FIG. 5 is a view in vertical section showing the carriage and gauging arm in operating position.

FIG. 6 is a view in vertical section showing the carriage at the end of the run.

FIG. 7 is a sectional view of the carriage with the clamp retracted.

FIG. 8 is an enlarged view of one form of clamp.

FIG. 9 is an enlarged view of another form of clamp.

FIG. 10 is a view in vertical section showing the carriage with a power driven helical screw drive.

FIG. 11 is a section taken along the line 11—11 of FIG. 1.

FIG. 12 is an enlarged end view of the chain and tape with parts broken away.

Referring to FIG. 1 of the drawings a plan view of the stock measuring machine is shown wherein the loading table 1 comprises a series of skids 2 each having a conveyor means 3 usually in the form of a chain with a moving abutment and operated from a common source. This conveyor may be actuated to either continuously slide or to jog or jostle the stock laterally along the skids until it reaches the longitudinal conveyor 4 which is made up of a series of power operated rolls 5. Adjacent rolls are connected by an endless chain and each of the adjacent rolls are therefore interconnected down the line and the motorized power source 13' is connected to the last roll 5 for driving the whole series of rolls. This power source is capable of being reversed so that one may move the stock to the right or left. However, the operation of the portion of the machine is to the right and the stock is moved in this direction. However, the capability of reversing the movement of the stock is sometimes very convenient to run the stock to the left and off of the conveyor 4, if it is desired not to employ the character of stock on the conveyor.

The operating station 6 is shown intermediate the feed roller conveyor 4 and the discharge roller conveyor 7. The stock operating station 6 employed to disclose this invention is an overhead saw and means to cut the stock and provide it with an automatic feed to the lower saw to cut the work while it remains at the work station and to reverse and raise the saw after the cut has been completed. Above the conveyor 7 is a guaging machine 8 which is in the form of a carriage 10 that is connected to a chain which in turn is driven by the motor 19 and functions as a positive drive means to move the carriage longitudinally on the track 11. The carriage is provided with a clamp to attach the carriage to the stock and carry it along the conveyor 7. However, the adjacent rollers 12 of the conveyor 7 are likewise directly connected by an endless chain and thus each of the rolls of a series are connected together and driven by a motorized power unit 13 at the end of the conveyor. This power unit may drive the rolls in either direction and when not in use the rolls will readily turn.

After the carriage 10 is positively driven and moves the work along the conveyor 7 to gauge the work relative to the saw the carriage is released from the work and drawn back to the position shown in readiness to engage the next work. This retraction of carriage is accomplished during the sawing period and when the saw cut is completed the saw automatically retracts, the work travels down the conveyor 7 until it strikes a stop 9 which stops the conveyor and permits the lateral discharge conveyor members to form endless chains 14 operating between the skids 15 that form the transfer table 16. The skids adjacent the end of the conveyor 7 are closer to each other to accommodate the shorter workpieces of stock. The lateral conveyor chains 14 deliver the stock onto the longitudinal conveyor 17 which consists of a series of power driven rolls for running the machine to the table 18 of a drilling machine.

The principal invention of this machine resides in the gauging machine 8 which is shown in side elevation in FIG. 2 wherein the conveyor 7 having its adjacent rollers 12 each connected by an endless chain 20 is illustrated. Thus there is one less endless chain 20 than there are numbers of rollers 12 and the last roller 12 is provided with a chain 21 that connects the system to the power unit 13. Each of the rollers are rotatably mounted in bearings resting upon the parallel beams 22 and 23 as shown in FIG. 3 which are mounted on the cross member 24 supported by the front stand 25 and the rear stand 26. It will be noted that the beam 23 is lower than the skids 15 which extend up to and are supported on the beam 23 with their surfaces slightly lower than the roller 12. Each pair of skids 15 support the conveyor chain 14 and the abutments 27 which drag the workpieces laterally from the conveyor 7.

The rear stand 26 extends above the cross member 24 and is provided at its upper end with an outwardly extending beam 28 which is braced by the brackets 30. The beams 28 suspend a pair of spaced channel members 31 the adjacent surfaces of which are provided with the upper and lower track rails 32 and 33. The lower track rails support the positively driven carriage 10 from its rollers 34 which ride on the upper surface of the lower track 33 and have a slight clearance with the under side of the upper track member 32 so as to prevent undue vertical play in the carriage.

The positively driven carriage 10 is provided with a pivot member 35 on which is pivotally mounted the clamp arm 36 and the counter weight arm 37. As shown in FIG. 8 the arm 36 is bifurcated having spaced sides with opposed inturned flanges or guides 41 to retain a slide member 38 supported by the rollers 40 slidable vertically within the guides 41 of the opposite sides of the arm 36. The slide 38 has a projecting portion 42 which in FIG. 8 is provided with a lower adjustable clamp screw 43 opposed to an upper operating clamp screw 44. In most instances, the stock is in the form of channel members or H or I beams and the web of this member is abutted against the gauging surface 45 on the front of the slide 38 and the top clamp screw 44 having a removable ratchet wrench to tightly clamp the same against the screw 43. The slide of course will be higher than that shown and as the work is drawn through the work station by this clamp any variation in curvature of the workpiece longitudinally of its axis will cause the slide to move vertically up and down thereby correcting for any bends in the stock and properly gauging the same so that the position to be cut by the saw will be accurately located within the operating station. The arm 36 is pivoted to permit it to be retracted as illustrated in FIG. 7 at which time it may be latched by the electromagnetically operated latch 46 armature. The electromagnet 46' is shown on the carriage in FIGS. 6 and 7. A similar latch 47 is employed to hold the arm vertically as shown in FIGS. 2 and 5 to 9. The latch 47 is in the form of a cam on the end of a shaft rotatable by the handle 50 on the opposite end of the shaft. When the handle is turned down the cam latch 47 is extended behind the keeper 48 as shown in FIGS. 6 and 7 and when the handle is turned 90° the cam will pass the keeper 48. This latch may likewise be operated electromagnetically by withdrawing the keeper 48 which is mounted on a rotary servomotor shaft that is turned to lift the keeper 48 by means of the rotary servomotor 49. Thus the latch 7 may be actuated by the handle 50 which when rotated releases the latch 47 from the keeper or the keeper 48 may be withdrawn from the latch by the rotary motor 49.

The positively driven carriage 10 as shown in FIGS. 5 and 7 has connected thereto the chain member 59. This is an endless chain and extends along the upper surface of the lower track 33 and around the sprockets 51 and 52 at opposite ends of the track 33 to permit the chain to extend from the carriage along the top of the track 33 and loop upwardly around the sprocket 51 and ride on the upper surface of the rails 32 and down around the sprocket 52 to where it is again engaged to the other end of the carriage 10. This endless chain can be tightened by a takeup on the sprocket 51 and it is also adjustably secured to the carriage. The chain 59 is of the ordinary type having side links with pivoting cross or transverse members which are smaller in dimension than the width of the side links. This permits the application of a steel tape illustrated at 53 which has one end fastened to the carriage and which travels along the under side of the chain as it rides on the upper surface of the rail 33 and along the outside of the chain as it passes over the sprocket 51 and along the top of the chain as it travels along the top surface of the rail 32 and back around the sprocket 52 to where it is attached to the opposite end of the carriage in a manner similar to that of the chain. This tape may be spot welded to the chains at different positions therealong to insure that it will not drag or otherwise be sliding on the surface of the lower rail 33. This tacking of the steel tape to the chain has very little effect in the measurement of the steel as the accuracy in the length of these cut stock pieces can be made within a sixteenth of an inch which is ample for general structural steel purposes. However, greater accuracy can be obtained by the actual control of the motor 19 driving a selected sprocket for operating the carriage 10 in which case the tape is a mere check.

Adjacent the operating station the shaft of the sprocket 52 is provided with a hand wheel 54 which is provided with a clutch so that when it is pushed inwardly engages the shaft to rotate the sprocket 52 and thus move the carriage while the tape is viewed through the optical slit 55 that provides an image in the mirrors 56 taken from the top of the tape 53, as shown in FIG. 12. The hand wheel 54 is more advantageous for fine adjustments of the carriage and the stock.

The reading at this point which is obtained by means of hair lines and may be provided with a vernier is the projected reading of the length of the stock clamped against the gauged surfaces 45 at the precise position of the saw or other instrument at the work station. Rather than employing the chain to drive the carriage as shown in FIG. 10, the carriage is driven by a helical screw 57 which extends the full length of the track and is supported by the bearings 58 at each end in view of the fact that a helical nut 60 is provided in the carriage which drives the carriage along the helical screw when the latter is rotated by the motor 19'. The carriage supports the intermediate portion of the helical screw. Here again the number of revolutions of the helical screw determines the measurement of the stock relative to the operating station. In this instance, the wheel 54 would be interconnected with the helical screw to move the carriage rather than with the sprocket 52.

As shown in FIG. 4, the wheel 54 is provided with the pinion 61 which engages the gear 62 on the shaft carrying the sprockets 52. Thus the pinion and gear function as a clutch. The pivotal member supporting the arm 36 may be actuated by the servomotor 63 as shown in FIG. 4 for the positive swinging of the arm from its vertically locked position as shown in FIG. 2 to its retracted locked position as shown in FIG. 7. The servomotor 63 may be in the form of a reversible rotary motor having a pinion geared to the pivot member 35 to swing the arm 36 in either direction but will permit the arm 36 to be moved by hand.

As shown in FIG. 11, the operating station 6 provides the base member 64 which carries the vertical columns 65 that are connected together by the bridge member 66 at the top thereof and which slidably supports the carriage member 67 on which is rotatably mounted the cold saw 68. As shown in FIG. 11, the stock is an H beam member 70 which is clamped between the jaws 71 and 72 at the operating station and functions as a vice to hold the work while being cut by the saw 68. Idler rollers 73 are supported within the base to carry the work through the operating station 6. However, these rollers do not have to be driven as a workpiece too short to span the distance between the conveyors 4 and 7 is light enough to move manually from one conveyor to the other.

The controls for the saw and the vice or clamping jaws 71 and 72 are indicated by the operating levers 74.

If the stock being measured leaves a short section on the conveyor 4 which is not desired to be employed at the time that it is there, the rollers 5 of the conveyor are reversed so as to run the unwanted short section off the open end of the conveyor to a suitable storage distributing member not shown.

In place of the clamping screws 43 and 44 as shown in FIG. 8, a magnet 80 may be employed on the slide 38. This magnet is preferably an electromagnet that may be energized to draw and hold the work against its exposed core faces which in this instance provides the gauging surface for the work with relation to the saw at the work station.

I claim:

1. A stock positioning machine comprising an operating station, a stock conveyor to support the stock for movement longitudinally through said operating station, a track extending longitudinally with said conveyor, a carriage movable along said track, a clamp on said carriage to engage the stock on said conveyor and secure it relative to said carriage, positive drive means engaging said carriage to move it and the end of the stock in either direction along said stock conveyor to a predetermined position relative to said operating station, the stock and the carriage being independently supported by said conveyor and said track respectively, a vise at said conveyor adjacent said operating station to hold the work piece for operation, said clamp including an arm, a slide movable vertically on said arm, and a stock gripping member carried by said slide to compensate for variations in said stock while being drawn across said conveyor by said carriage.

2. A stock positioning machine comprising an operating station, a stock conveyor to support the stock for movement longitudinally through said operating station, a track extending longitudinally with said conveyor, a carriage movable along said track, a clamp on said carriage to engage the stock on said conveyor and secure it relative to said carriage, positive drive means engaging said carriage to move it and the end of the stock in either direction along said stock conveyor to a predetermined position relative to said operating station, the stock and the carriage being independently supported by said conveyor and said track respectively, a vise at said conveyor adjacent said operating station to hold the work piece for operation, said clamp including an arm, pivot means to secure said arm to said carriage, a latch to hold said arm in position to permit said clamp to engage and hold the stock, and a second latch to hold said arm withdrawn from the stock and permit said carriage to travel past the stock.

3. The stock positioning machine of claim 2 which also includes power means to swing said arm out of the path of the stock when the clamp is not attached to the stock.

4. A stock positioning machine comprising an operating station, a stock conveyor to support the stock for movement longitudinally through said operating station, a track extending longitudinally with said conveyor, a carriage movable along said track, a clamp on said carriage to engage the stock on said conveyor and secure it relative to said carriage, positive drive means engaging said carriage to move it and the end of the stock in either direction along said stock conveyor to a predetermined position relative to said operating station, the stock and the carriage being independently supported by said conveyor and said track respectively, a vise at said conveyor adjacent said operating station to hold the work piece for operation, said positive drive means including an endless chain lying on said track and having its ends secured to the opposite ends of said carriage, sprocket means at each end of said track, a second track to support the free flight of said chain between said sprocket means, a measuring tape on said chain to determine the relative position of said carriage and the stock from said operating station, an image reproducing means beamed to said tape to project the image of the position of said carriage and the stock relative to said operating station, a clutch means having one side connected with one of said sprocket means, and a hand wheel connected to another side of said clutch to provide a hand adjustment of said carriage and workpiece.

References Cited in the file of this patent
UNITED STATES PATENTS

| | | |
|---|---|---|
| 392,254 | Barnhurst | Nov. 6, 1888 |
| 686,911 | Schwarz | Nov. 19, 1901 |
| 787,510 | Herbert | Apr. 18, 1905 |
| 1,609,654 | Makowski | Dec. 7, 1926 |
| 1,775,952 | Turrettini | Sept. 16, 1930 |
| 1,933,446 | Olson | Oct. 31, 1933 |
| 1,941,117 | Teach | Dec. 26, 1933 |
| 2,017,535 | Hammer | Oct. 15, 1935 |
| 2,334,887 | Siegerist | Nov. 23, 1943 |
| 2,653,502 | Meyer | Sept. 29, 1953 |
| 2,829,759 | Parker | Apr. 8, 1958 |
| 2,891,660 | Honig | June 23, 1959 |
| 2,959,412 | Sjostrom | Nov. 8, 1960 |